US010294773B2

(12) United States Patent
Donderici et al.

(10) Patent No.: US 10,294,773 B2

(45) Date of Patent: May 21, 2019

(54) METHOD AND SYSTEM FOR MAGNETIC RANGING AND GEOSTEERING

(71) Applicant: Halliburton Energy Services, Inc., Houston, TX (US)

(72) Inventors: Burkay Donderici, Houston, TX (US); Clinton James Moss, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 74 days.

(21) Appl. No.: 15/033,556

(22) PCT Filed: Dec. 23, 2013

(86) PCT No.: PCT/US2013/077571
§ 371 (c)(1),
(2) Date: Apr. 29, 2016

(87) PCT Pub. No.: WO2015/099673
PCT Pub. Date: Jul. 2, 2015

(65) Prior Publication Data

US 2016/0273345 A1 Sep. 22, 2016

(51) Int. Cl.

| | |
|---|---|
| ***E21B 47/00*** | (2012.01) |
| ***E21B 47/022*** | (2012.01) |
| ***E21B 47/12*** | (2012.01) |
| ***E21B 7/10*** | (2006.01) |
| ***E21B 7/04*** | (2006.01) |
| ***E21B 47/024*** | (2006.01) |
| ***G01V 3/26*** | (2006.01) |
| *E21B 43/24* | (2006.01) |
| *E21B 44/00* | (2006.01) |

(52) U.S. Cl.
CPC .......... *E21B 47/02216* (2013.01); *E21B 7/04* (2013.01); *E21B 7/10* (2013.01); *E21B 47/024* (2013.01); *E21B 47/122* (2013.01); *G01V 3/26* (2013.01); *E21B 43/2406* (2013.01); *E21B 44/00* (2013.01)

(58) Field of Classification Search
CPC ................................................ E21B 47/02216
See application file for complete search history.

(56) References Cited

U.S. PATENT DOCUMENTS 4,372,398 A 2/1983 Kuckes
5,230,387 A * 7/1993 Waters .................... E21B 7/068 175/45
5,258,755 A 11/1993 Kuckes
(Continued)

FOREIGN PATENT DOCUMENTS

EP 0104854 A2 4/1984
RU 2159317 C1 11/2000
RU 2405106 C1 11/2010

OTHER PUBLICATIONS

Magnetic dipole—Britannica Online Encyclopedia, https://www.britannica.com/print/article/357033 Jan. 8, 2018.*
(Continued)

*Primary Examiner* — Janine M Kreck
(74) *Attorney, Agent, or Firm* — Haynes and Boone, LLP

(57) ABSTRACT

A magnetic ranging system utilizes the natural shape of magnetic fields for steering and/or landing of one wellbore in relation to another wellbore.

25 Claims, 7 Drawing Sheets

(56) References Cited

U.S. PATENT DOCUMENTS

| | | | | |
|---|---|---|---|---|
| 5,485,089 | A | 1/1996 | Kuckes | |
| 5,513,710 | A | 5/1996 | Kuckes | |
| 5,923,170 | A | 7/1999 | Kuckes | |
| 6,736,222 | B2 | 5/2004 | Kuckes | |
| 6,991,045 | B2 * | 1/2006 | Vinegar | B09C 1/02 166/66.5 |
| 7,510,030 | B2 | 3/2009 | Kuckes et al. | |
| 7,568,532 | B2 | 8/2009 | Kuckes et al. | |
| 8,146,685 | B2 | 4/2012 | Lee et al. | |
| 8,490,717 | B2 * | 7/2013 | Bergstrom | G01V 3/26 175/40 |
| 9,714,563 | B2 * | 7/2017 | Wilson | E21B 43/2406 |
| 2006/0131013 | A1 | 6/2006 | McElhinney | |
| 2008/0041626 | A1 * | 2/2008 | Clark | E21B 47/02216 175/45 |
| 2013/0169278 | A1 | 7/2013 | Bittar et al. | |
| 2013/0228371 | A1 | 9/2013 | Farrar et al. | |

OTHER PUBLICATIONS

Office Action issued for Canadian Patent Application No. 2,929,301 dated May 16, 2018, 4 pages.

Notification on Patentability Check Search Results issued for Russian Patent Application No. 2016116776 dated Jan. 16, 2018, 6 pages.

Office Action issued for Russian Patent Application No. 2016116776 dated Sep. 11, 2017.

International Preliminary Report on Patentability, dated Jul. 28, 2015, PCT/US2013/077571, 5 pages, IPEA/US.

International Search Report and The Written Opinion of the International Search Authority, or the Declaration, dated Apr. 17, 2014, PCT/US2013/077571, 10 pages, ISA/US.

* cited by examiner

METHOD AND SYSTEM FOR MAGNETIC RANGING AND GEOSTEERING

The present application is a U.S. National Stage patent application of International Patent Application No. PCT/US2013/077571, filed on Dec. 23, 2013, the benefit of which is claimed and the disclosure of which is incorporated herein by reference in its entirety.

FIELD OF THE DISCLOSURE

The present disclosure relates generally to downhole ranging and, more specifically, to a ranging system utilizing a magnetic beacon to guide one wellbore toward another wellbore.

BACKGROUND

As the easy-to-access and easy-to-produce hydrocarbon resources have been depleted over the last century, more and more difficult wells remain. Also, as global hydrocarbon demand is continuously growing, meeting this demand requires development of more advanced recovery procedures, often referred to in industry as complex recovery completions and production techniques. These techniques include, for example, Steam Assisted Gravity Drainage ("SAGD"), Thermal Assisted Gravity Drainage ("TAGD"), Toe to Heel Air Injection ("THAI"), Vaporized Hydrocarbon Solvent ("VAPEX") production and Fire Flooding. Such techniques address the mobility problem of the heavy oil wells by thermally and/or chemically altering the viscosity of the bitumen to allow for easy extraction.

While each of the complex completion techniques offer a solution to the issue of heavy oil extraction, they all rely on a common challenge facing wellbore construction—the precise placement of adjacent local cased wellbores. With SAGD and TAGD, injector wells must be precisely placed within a few meters of the production well, with the injector well being placed a few meters on top of the producer. Traditionally, this has been accomplished by placing both the injector and producer wellhead within a few meters at surface. The second well drilled in the well pair subsequently "follows" the in-situ cased wellbore using some magnetic ranging method.

However, due to issues such as location footprint constraints, infield drilling requirements and producer well replacement, it is often desired that a new producer or injector well be re-drilled from a separate location. This location is often selected so that the end of the lateral insitu well is approached by a new drilling well from the opposite direction. However, due to the increased wellhead to wellhead distance and the uncertainty associated with traditional surveying based on gravity and earth's magnetic fields, the precise distance between the two wells cannot be achieved. Also, in the case of the THAI method, it is required that the toe of the horizontal cased wellbore be intersected with a directional well, a requirement which cannot be met using traditional surveying techniques alone.

To address the precision wellbore placement requirement of these "opposite approach azimuth" complex completion methods, industry standard magnetic ranging tools have been deployed, such as the Magnetic Guidance Tool ("MGT") and Rotating Magnetic Ranging Service ("RMRS"). However, these techniques are not optimal, as the accuracy of the system at the range required for the particular application is limited. This limitation translates into operational inefficiency in practice, as sidetracks are often necessary to deliver the intersection or precise separation that is required. These operational inefficiencies can also translate into inefficiency in the completion and production of the well, as the well separation and/or intersection point are less than optimal.

In some complex wellbore construction projects, the primary objective is not hydrocarbon production, but rather hydrocarbon transportation. In hydrocarbon transportation projects, two wellbores drilled from opposite directions are often intersected to produce a common wellbore. This 'utube" communication between wellbores allows the deep subterranean borehole to be completed with a common casing string and used as a pipeline for hydrocarbon transportation. While similar projects have been completed in the past with conventional magnetic ranging techniques, the same inefficiencies associated with these techniques as described above has led to cost overruns and general operational efficiency.

Accordingly, there is a need in the art for improved downhole ranging techniques to overcome these and other shortcomings in conventional approaches.

DESCRIPTION OF ILLUSTRATIVE EMBODIMENTS

Illustrative embodiments and related methodologies of the present disclosure are described below as they might be employed in a ranging system and method utilizing a magnetic dipole beacon to guide one wellbore toward another wellbore. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, the present disclosure describes illustrative ranging methods and systems that utilize a magnetic dipole beacon to guide one wellbore towards another wellbore. In a generalized embodiment, the beacon induces low frequency magnetic fields into the formation from a first wellbore, which are then sensed by one or more dipoles (acting as receiver(s)) in a second wellbore. The beacon and/or receiving dipoles are magnetic dipoles, and in certain embodiments one or both may be a triaxial magnetic dipole. Nevertheless, in either embodiment, the magnetic fields that are emitted from the beacon form a natural path of approach to the first wellbore. As a result, the second wellbore can be steered to align with the magnetic field direction, which will automatically establish the ideal approach towards the first wellbore.

Figure 1A:
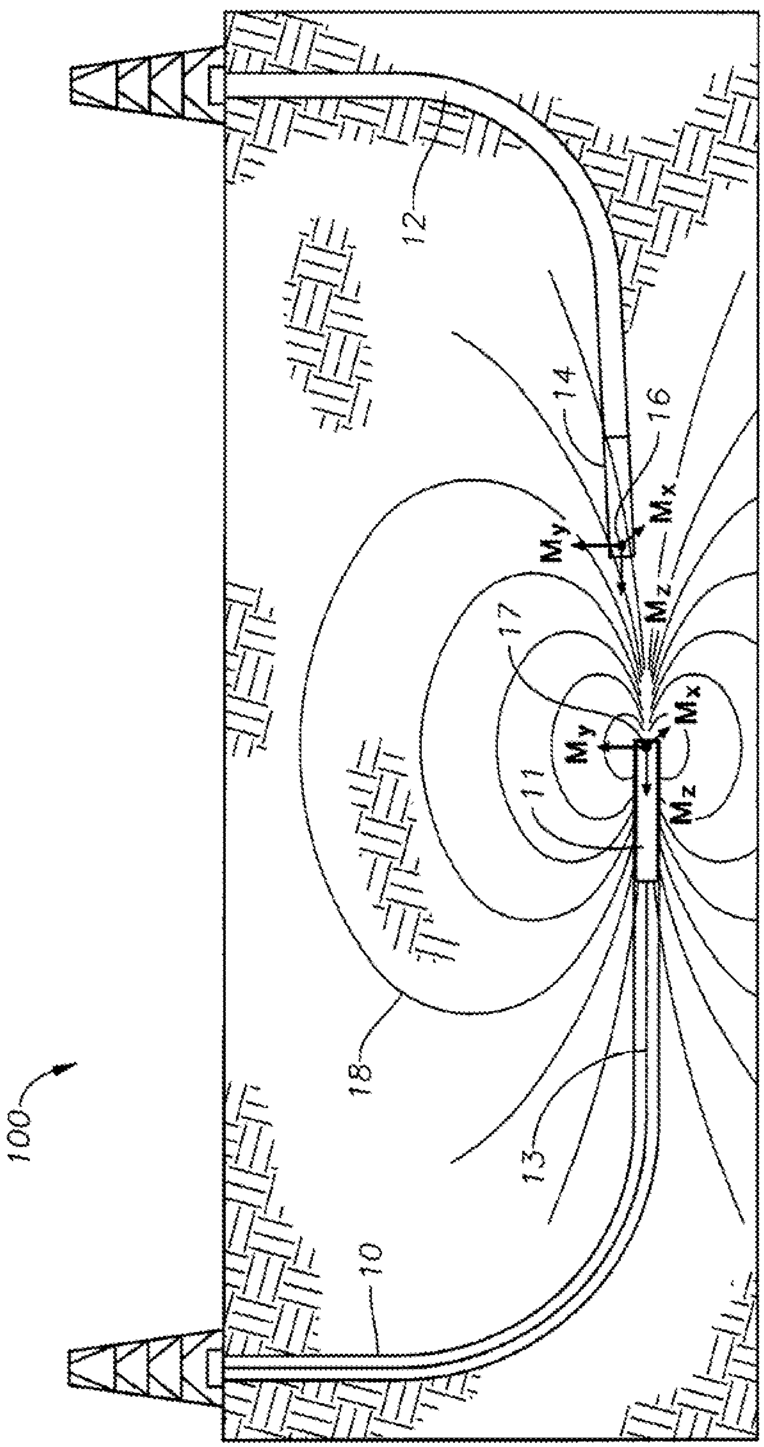
FIG. 1A illustrates a ranging system, according to certain illustrative embodiments of the present disclosure.
Figure 1B:
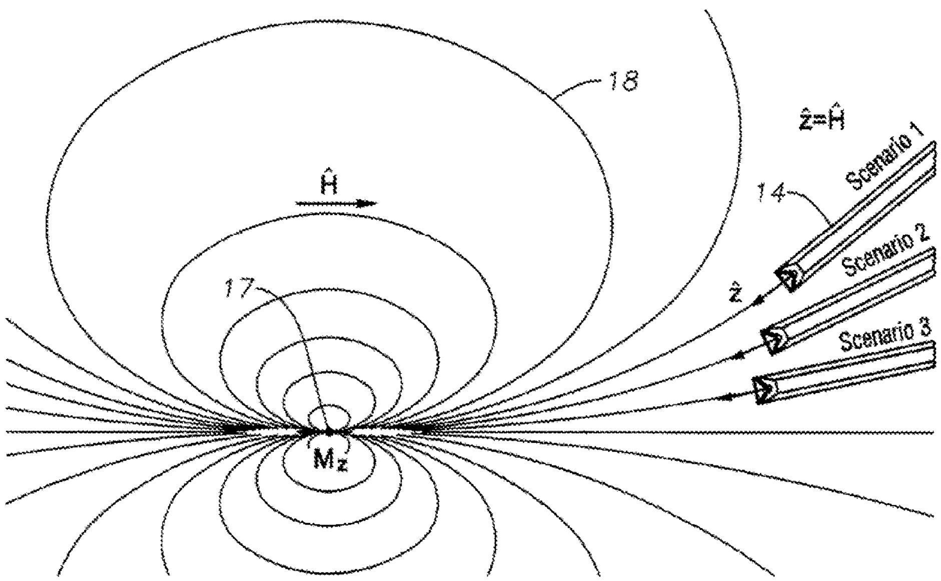
FIG. 1B illustrates alternative approach scenarios of a drilling assembly, according to certain illustrative embodiments of the present invention.
Figure 1C:
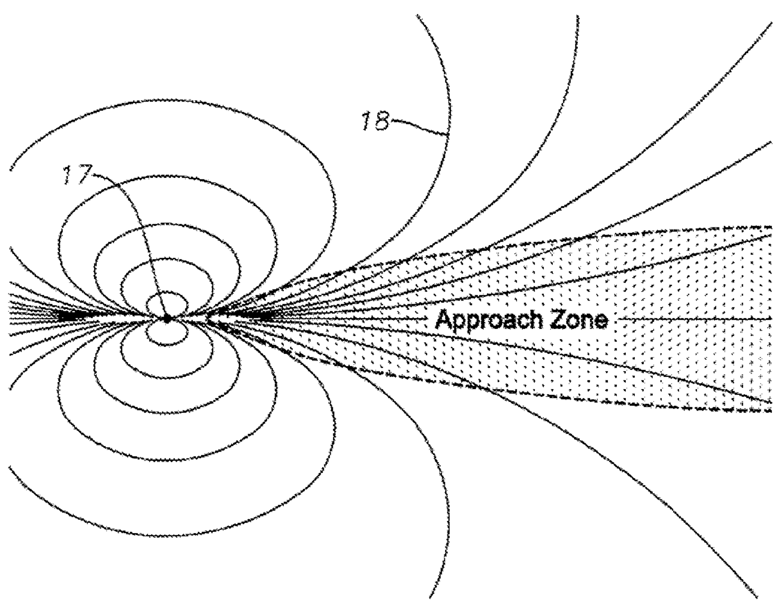
FIG. 1C illustrates the "approach zone" of a drilling assembly, according to certain illustrative embodiments of the present invention.

FIGS. 1A-1C are provided to illustrate this generalized summary of the present disclosure. FIG. 1A illustrates an illustrative ranging system 100 of the present disclosure that can be utilized in, for example, a SAGD application. Here, a first well 10 (e.g., producer wellbore) has been drilled using any suitable drilling technique, and a bottomhole assembly 11 is deployed downhole via a wireline 13, for example. Bottom hole assembly 11 includes a magnetic dipole 17 serving as the beacon. Beacon 17 may take a variety of forms, including for example, a solenoid or magnetometer. In this embodiment, dipole 17 is a triaxial magnetic dipole positioned near the toe of first well 10. A second well 12 (e.g., injector wellbore) is then drilled using drilling assembly 14 which may be, for example, a logging-while drilling ("LWD") assembly, measurement-while drilling assembly ("MWD") or other desired drilling assembly. In this exemplary embodiment, drilling assembly 14 includes a bottom hole assembly having a triaxial magnetic dipole 16 serving as the receiver. Note, however, that dipoles 16 and 17 may serve as a beacon or receiver, and may take the form of other dipole realizations other than triaxial.

As will be described in greater detail below, during an exemplary drilling operation using relative positioning system 100, beacon 17 emits low frequency magnetic fields 18 which propagate toward second wellbore 12. Magnetic fields 18 form a natural path of approach which are utilized by drilling assembly 14 to geosteer second well 12 as desired. To achieve this, local or remote processing circuitry calculates the direction of magnetic fields 18 and uses this data to determine the distance and direction to beacon 17 within first well 10. Once the relative position is determined, the circuitry generates signals necessary to steer the drilling assembly 14 in the direction needed to intersect or avoid first well 10 as desired.

To further summarize the intent of this disclosure, FIG. 1B shows alternative approach scenarios of drilling assembly 14, while FIG. 1C shows the "approach zone" of drilling assembly 14. First well 10 is not illustrated for simplicity. As shown in FIG. 1B, in each approach scenario 1-3, drilling assembly 14 steers second well 12 towards direction H of magnetic fields 18 which naturally meets the two wells. If such intersection is not desired, other illustrative embodiments of the present disclosure utilize magnetic field gradients to determine the distance and direction to beacon 17 once the wells get close enough to each other, and the wells can be steered along the ideal approach (such as a injector/producer configuration of SAGD). In other illustrative embodiments, orientation of beacon 17 can be adjusted based on the desired approach angle, thus allowing an ideal approach in the approach zone, as shown in FIG. 1C.

Although the present disclosure is described in the context of a SAGD application, it may be utilized in a variety of other applications that accurately and reliably position a well being drilled with respect to a nearby well. Such applications may include, for example, the drilling of relief wells and/or well avoidance operations. In a well avoidance application, a well is drilled utilizing the positioning system described herein, which actively searches for the magnetic fields emitted by the beacon in the drilling path. If such wells or structures are detected, the positioning system alters the drill path accordingly. In relief operations, the first wellbore may be a blow out well, while the second wellbore is an intersecting well utilized to stop a hydrocarbon spill emitting from the first well. Here, the intersecting well may be substantially perpendicular to the other well. In yet other embodiments, the second well may be drilled such that its end intersects with the toe of the first wellbore to create a utube.

Figure 2A:
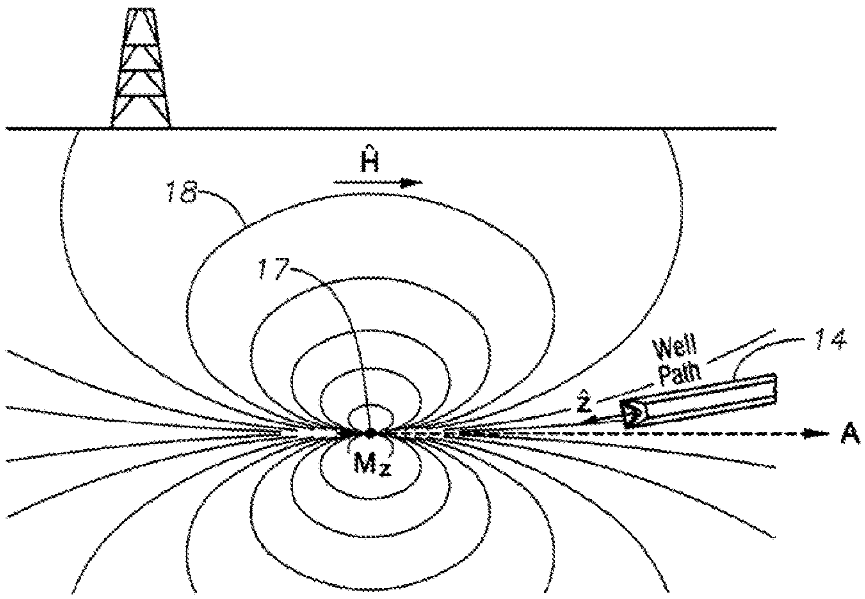
FIG. 2A illustrates the magnetic fields at a cross-section from a beacon that is oriented horizontally along axis A, according to certain illustrative embodiments of the present disclosure.
Figure 2B:
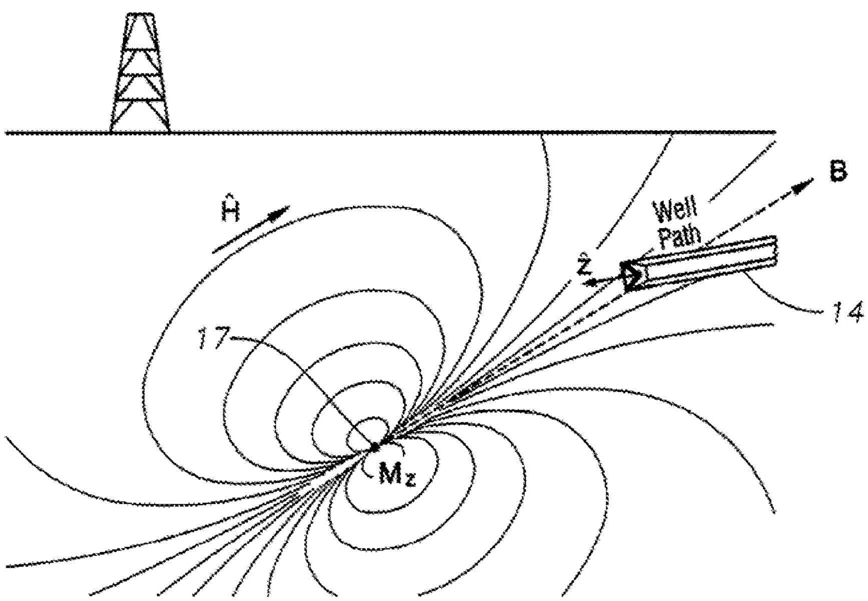
FIG. 2B illustrates a beacon oriented at a 45 degree angle along axis B, according to certain illustrative embodiments of the present disclosure.

The operation of an illustrative magnetic beacon will now be described. FIGS. 2A and 2B illustrate the operation of a magnetic beacon oriented at 0 degrees and 45 degrees, respectively, according to illustrative embodiments of the present disclosure. Magnetic field, H, from a magnetic dipole (emitted from beacon 17 or receiver 16, e.g.) at low frequency is independent of the resistivity of the formations, and it can be written as:

$$\overline{H}=(1/4\pi)(3\hat{r}(\hat{r}-\hat{u})-\hat{u})(1/r^3) \qquad \text{Eq.(1)},$$

where $\hat{r}$ is the unit vector pointing from the beacon to the antenna in the other well, and $\hat{u}$ is the unit vector in the direction of the magnetic field measurement.

FIG. 2A shows the magnetic fields at a cross-section from a beacon 17 that is oriented horizontally along axis A, while FIG. 2B shows beacon 17 oriented at a 45 degree angle along axis B. As it can be seen, magnetic fields 18 propagate from one pole to the other in a roughly circular pattern, where each magnetic field line originates and terminates at the magnetic dipole position. The fields 18 that are around the magnetic dipole 17 (in roughly radial direction) show a mainly circular pattern in the volume of operation. As a result, they cannot be used effectively for guiding bottom hole assembly 14. However, the fields 18 that are roughly in axial direction (adjacent axis A,B) from the dipole beacon 17 follow a linear or curved pattern, which marks a smooth approach to the beacon position. Each beacon orientation allows a smooth approach from a certain approach zone, as shown in FIG. 1C. If approach from a different approach zone is required, beacon orientation can be altered to point to that zone as shown in FIG. 2B.

There are a variety of ways in which to alter the orientation of the beacon. For example, alteration of the beacon orientation may be performed mechanically by rotating the antenna physically in the desired direction. It can also be accomplished synthetically by adjusting relative strengths of multiple antennas that make up the beacon, in the case of a beacon implementation with multiple antennas that are pointing in different directions.

In certain illustrative embodiments of the present disclosure, the angle of beacon 17 can be varied with respect to time to optimize the well path of approach. In one embodiment, the adjustment can be performed manually or automatically by an electrical system that determines the ideal angle based on the absolute and relative position of wells. In other embodiments, the orientation can also be adjusted to find or maintain the minimum or the maximum signal at the receiver in the other well. In yet other embodiments, the beacon orientation at which the maximum axial or total received fields are obtained can be maintained to optimize the guidance operation. The beacon orientation can also be used along with the survey information from the second well to triangulate or locate the second well with respect to the first well, where the location information can be used to optimize a well path.

In other embodiments, multiple beacon orientations can be established at the same position along a borehole by placing multiple collocated or staggered magnetic dipoles, and by varying the signal levels of such dipoles to establish different magnetic dipole orientations. As an example, a tri-axial beacon can be used to synthesize any arbitrary beacon orientation from a weighted combination of all three. Also, different frequencies can be used by different beacons to allow multiple measurements to be made simultaneously in the other wellbore. When multiple beacons are used at the same position, they can allow multiple choices in the angle of approach.

As described above, preferably the beacon is placed at or near the toe of the well. However, depending on the operational need, it can also be placed at different positions along the well as desired. For example, if the well needs to be intersected in the middle of a horizontal section, the beacon can be placed at the point of desired intersection. In such cases, the beacon may be removed immediately before the intersection, after the intersection path is set with high confidence. In other illustrative embodiments, multiple beacons can be placed at different positions along the wellbore, and steering decision can be made collectively based on all of the beacons. For example, a toe beacon can be used in the approach, but after the approach is complete, the beacon can be moved to a new location in the first well to allow ideal SAGD placement.

The beacon may be positioned downhole in a variety of ways. For example, the beacon may be deployed along a wireline (solenoid on a wire, e.g.) as shown in FIG. 1A. Alternatively, for example, the beacon may be deployed along a wireline logging tool, a production tool along a cased wellbore, as part of a LWD tool, or may even be permanently deployed in a cased wellbore. When permanently deployed, the beacons may be made out of a high friction housing material which prevents it from sliding along the wellbore. Alternatively, the beacon may simply be positioned along a horizontal portion of the wellbore, thus using gravity to maintain its position. In yet other embodiments, the housing may be a magnetic housing which adheres it to the casing or some other metallic downhole structure. In case the casing is composed of magnetic material, a direct current signal can be used to turn the beacon into an electromagnet which can simultaneously be excited with the alternating current that operates the beacon.

In yet other illustrative embodiments of the present disclosure, the magnetic beacons may also be placed at the surface or at the bottom of the sea floor in an offshore application. In such applications, depending on the desired well path, magnetic field lines can be utilized directly to steer the well.

Figure 3:
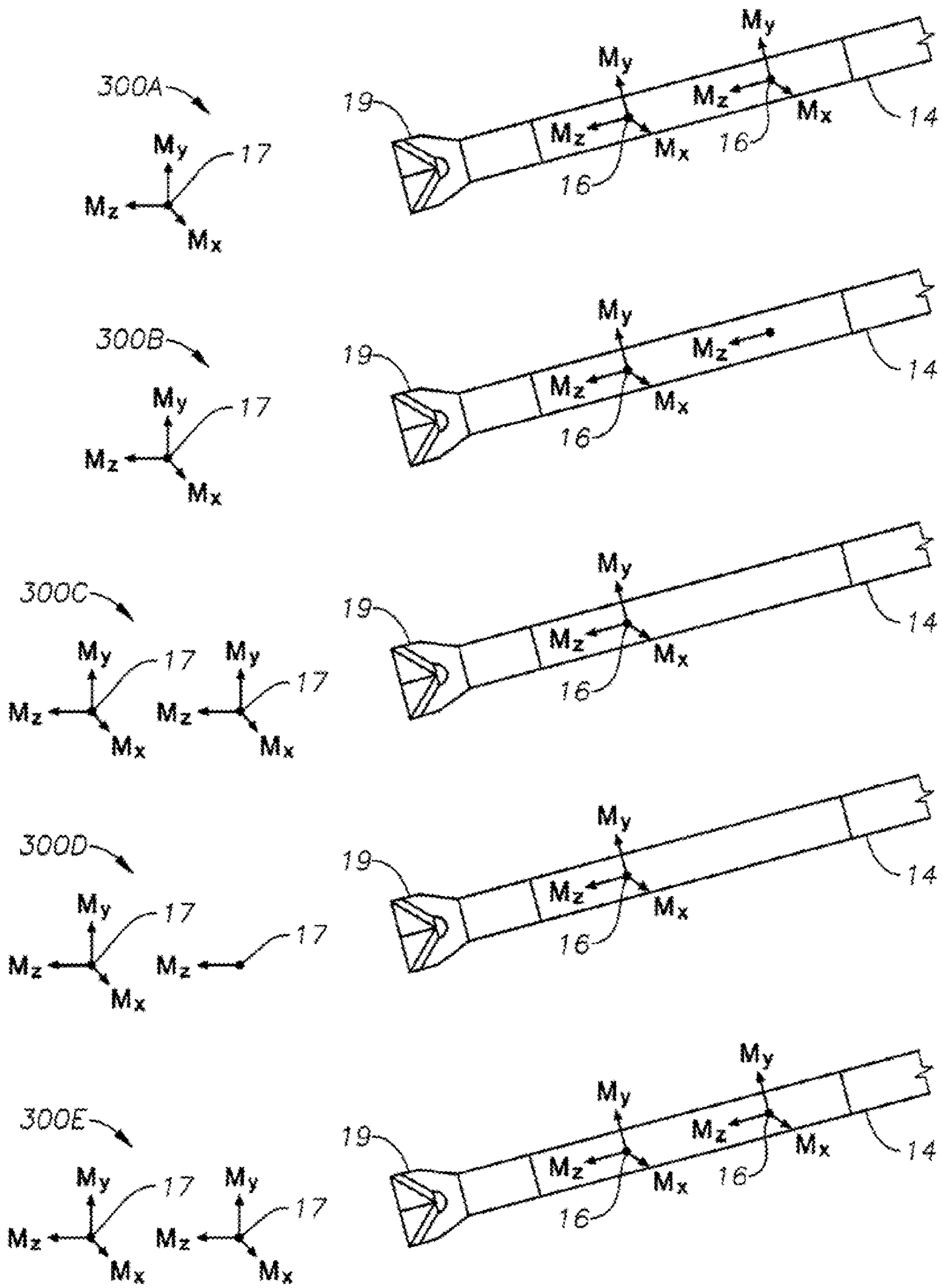
FIG. 3 illustrates a variety of beacon/receiver dipole configurations of ranging systems, according to alternative embodiments of the present disclosure.

FIG. 3 is a simplified illustration of a variety of beacon/receiver dipole configurations of ranging systems 300A-E, according to alternative embodiments of the present disclosure. The beacons dipoles 17 are shown on the left-hand side and the receiver dipoles 16 are shown on the right-hand side. Although the described application is based on LWD measurements for the receiver(s) dipole 16, it is also possible to utilize a wireline tool to make such measurements, as previously described. Such a wireline tool can be deployed inside the bottom hole assembly 14, for example, or it can replace it completely. In some embodiments, receiver dipoles 16 are placed as close as possible to the drill bit 19, however, due to presence of drill motor and difficulties in routing power and communication through the motor section, it may be more feasible to have the receivers 16 above the bit 19 and drill motor. Note that in alternate embodiments, dipoles 16,17 may act as a beacon or receiver.

Still referring to FIG. 3, in certain embodiments, beacon(s) 17 may be comprised of a single magnetic dipole that is oriented in the desired direction mechanically or by design. In such cases, the dipole may be oriented in the axial (z−) direction (as is one of the beacons 17 of system 300D). However, it is more advantageous to have a tri-axial beacon configuration with three collocated magnetic dipoles that are ideally placed orthogonal to each other. Such beacons are shown in ranging systems 300A, B, C (two triaxial beacons), D (single triaxial beacon and one single-axis beacon), and E (two triaxial beacons). The triaxial configuration allows orientation of the beacon in any desired direction without any mechanical manipulation.

In yet other embodiments, beacons 17 may be comprised of multiple beacon dipoles at different positions along the wellbore (or a downhole tool/assembly), such as shown in ranging systems 300C, D and E. Such embodiments allow the acquisition of gradient measurements, which is the difference of magnetic fields between two closely spaced receivers 16. The orientation of the gradient may be arbitrary, however, a z-directed gradient (such as that shown in system 300C, D, and E) is ideal for an horizontal approach. In other illustrative embodiments, however, other gradient directions (such as x- or y-gradients) may also be acquired.

In those embodiments utilizing multiple beacons, for example, the beacons may be referred to as a first and third magnetic dipole. Here, the first magnetic dipole may be utilized to acquire a first magnetic field measurement, while the third magnetic dipole is utilized to acquire a second magnetic field measurement. The directions of the first and/or second magnetic field measurement may then be utilized for ranging/steering determinations as described herein.

The magnetic dipoles can be realized with, for example, tilted or non-tilted coils, solenoids, flux-gate magnetometers, atomic magnetometers, or any other type of device that can measure magnetic fields. The sensitivity and signal to noise ratio of the dipole receiver determines the range and accuracy of the measurement. As understood in the art, the gradient measurement requires much higher signal to noise in the magnetic field, compared to an absolute measurement for achieving the same percentage accuracy.

Still referring to FIG. 3, the receiver(s) 16 that are shown in right-hand side of the figure are also magnetic dipoles and they are of tri-axial configuration. However, one of the receivers 16 of system 300B is a single-axis dipole receiver. Nevertheless, in those embodiments using triaxial designs, the triaxial receivers may be realized by a one or more single or dual axis receivers, thereby taking advantage of the multiple measurements at different rotation angles that are naturally available during the rotation phase of the drilling process. In such embodiments, a triaxial measurement is synthetically constructed from multiple single or dual axial measurements at different rotation angles by combining all measurements with appropriate weights. Such manipulation of measurement coordinate systems is based on linear algebra and vector manipulation. Similar to what was described above for the beacon, the receivers in certain embodiments can also perform a gradient measurement for calculation of distance or orientation. The gradient orientation can be the axial (z–) direction for a horizontal approach, however, alternate direction could also be acquired. Each magnetic dipole that makes of one of the three axes, may be collocated or staggered along the borehole axis with respect to each other.

The design of bottom hole assembly 14 may take a variety of forms. In one illustrative embodiment, the receiving dipole(s) may be placed in grooves on the bottom hole assembly with a protective cover. In others, the receiving dipole(s) are positioned along the bottom hole assembly within a non-magnetic collar which does not interfere with operation of the dipoles. It is noted here that what is described herein for the transmitting or receiving dipoles is not considered to be limiting and alternative configurations with more and less number of dipoles are possible.

Figure 4:
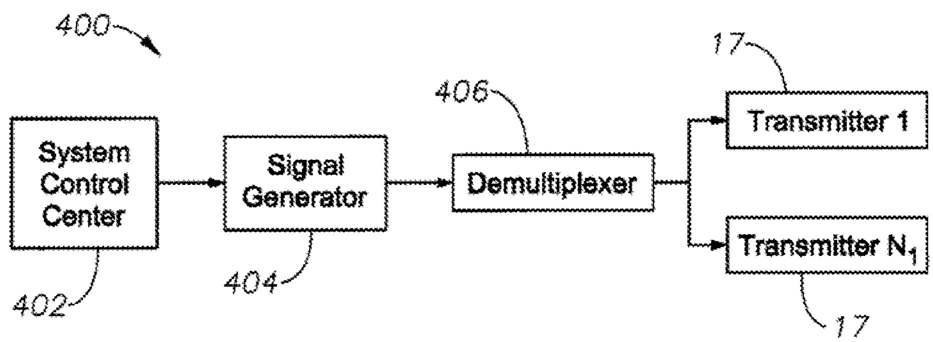
FIG. 4 is a block diagram of system circuitry for a beacon, according to certain illustrative embodiments of the present disclosure.

FIG. 4 is a block diagram of system circuitry 400 for the beacon dipole, according to certain illustrative embodiments of the present disclosure. A system control center 402 activates the signal generator 404 to thereby produce a signal that is routed to different beacons as necessary. A de-multiplexer 406 can be used to select which beacon 17 is operated, however multiple beacons can also be operated at the same time as mentioned above. In certain embodiments, the system can be operated as narrow band at a substantially fixed frequency, or it can be operated with a time-domain pulse with wide-band excitation. For the wide-band excitation, the maximum frequency of operation can be limited to minimize the formation resistivity effects which may complicate the fields and interpretation. Yet, a wide band of low frequencies in the range 0.01-100 Hz, for example, can be used also partially dependent on the desired range of operation. Furthermore, the excitation may be dynamically optimized based on the estimated range between the transmitting and receiving dipoles. Again, as previously mentioned, the beacon magnetic dipoles may be transmitting and drilling well magnetic dipoles may be receiving. Alternatively, the beacon magnetic dipoles may be receiving and drilling well magnetic dipoles may be transmitting.

Although this embodiment of circuitry 400 forms part of beacon 17, in other illustrative embodiments, one or more components of circuitry 400 may be located at a remote location from beacon 17 (surface, e.g.). In such embodiments, beacon 17 would include the necessary communications circuitry for wired or wireless communications.

Figure 5:
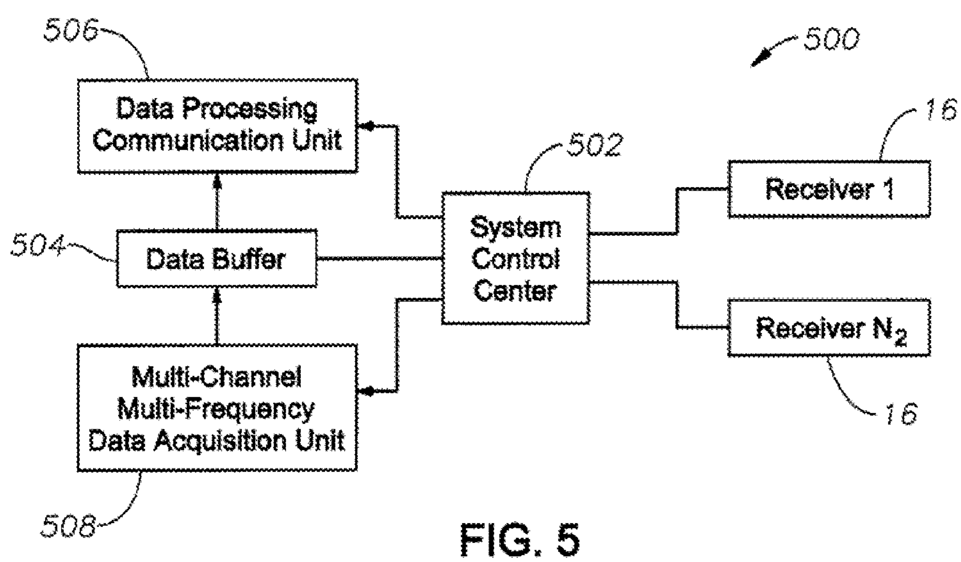
FIG. 5 is a block diagram of system circuitry used for a receiver dipole, according to certain illustrative embodiments of the present disclosure.

FIG. 5 is a block diagram of system circuitry 500 used for the receiver dipole(s), according to certain illustrative embodiments of the present disclosure. A system control center 502 receives the magnetic field measurement signals from a multitude of receivers 16 at the same of different positions along the wellbore. In this embodiment, the received data is stored in a data buffer 504 and then communicated to the surface via processing/communications unit 506 for further processing. In certain other embodiments, some or all of the processing may be performed downhole, which may provide savings in telemetry bandwidth. The acquisition unit 508 may make measurements as a function of time and the measurement may be converted to frequency domain via Fourier transform. The magnetic field measured data may be analyzed in complex Phasor domain at individual frequencies with real and imaginary parts, or with associated phase or amplitude information. Due to the low frequency nature of the excitation, the received measurement signals will have substantially constant phase which is independent of the formation properties. As a result, amplitude information is expected to carry most of the desired data, and phase can be neglected from communication and subsequent processing, in certain embodiments.

Although this embodiment of circuitry 500 forms part of drilling assembly 14, in other illustrative embodiments, one or more components of circuitry 500 may be located at a remote location from assembly 14 (surface, e.g.). In such embodiments, drilling 14 would include the necessary communications circuitry for wired or wireless communications to thereby communicate data back uphole and/or to other assembly components (to steer a drill bit forming part of assembly 14, for example).

In alternate embodiments, the circuitry 400,500 necessary to perform one or more aspects of the techniques described herein may be located at a remote location away from beacon 17/drilling assembly 14, such as the surface or in a different wellbore. Although not shown, circuitry 400,500 may include at least one processor and a non-transitory and computer-readable storage, all interconnected via a system bus. Software instructions executable by the processor for implementing the illustrative relative positioning methodologies described herein in may be stored in local storage or some other computer-readable medium. It will also be recognized that the positioning software instructions may also be loaded into the storage from a CD-ROM or other appropriate storage media via wired or wireless methods.

Moreover, various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

In certain other illustrative embodiments, calibration of the magnetometers and coils used as transmitting or receiving dipoles can be performed via one of the standard and available surface or in-situ calibration methods. Moreover, in certain embodiments, calibration may be performed as a function of pressure and temperature, which reduces the errors in the calibration application with varying environmental conditions.

As previously described, embodiments of the present disclosure analyze the direction of magnetic fields to determine the direction to the beacon. As a result, a drilling assembly may be steered along a desired well path. In certain other embodiments, the distance to the beacon may also be determined. Here, the distance calculations performed by system control center 502 will now be described. With reference to FIGS. 1A-5, provided that the second wellbore 12 is in the approach zone, the magnetic field can be approximated as the following:

$$\overline{H}=(1/2\pi)\hat{u}(1/u^3) \quad \text{Eq.(2a)},$$

$$H_u=1/(2\pi u^3) \quad \text{Eq.(2b)},$$

where u is the distance between the beacon and receiving dipoles and $H_u$ is the projection of $\overline{H}$ in the û direction. $H_u=\overline{H}\cdot\hat{u}$, where · is inner product operation. System control center 502 can then calculate the distance between the beacon and the receiver based on Equations (2a,b) as follows:

$$u=\sqrt[3]{(1/(2\pi H_u))} \quad \text{Eq.(3)},$$

where $\sqrt[3]{}$ refers to the cube root.

Even though Equation (3) can be used to calculate the distance in certain embodiments, it presents challenges because the exact strength of the beacon and gain of the receiver may not be known or accurately calibrated. Even though calibration may have been performed individually to the beacon and the receiver, after fabrication, combined gain of the beacon and receiver may have drifted. As a result, the distance calculation of system control center 502 may be skewed by such factor. In order to avoid such problem, certain embodiments of the present disclosure perform a gradient measurement (derivative of the field along direction u) as follows:

$$(\partial H_u)/(\partial u)=-3/(2\pi u^4) \quad \text{Eq.(4)}.$$

When the ratio between the absolute measurement (i.e., amplitude of the measurement) and gradient measurement are taken, distance between the beacon and the receiver can be computed by system control center 502 in a normalized fashion that is free of any gain errors as follows:

$$H_u/((\partial H_u)/(\partial u))=-(1/3)u \quad \text{Eq.(5a)},$$

$$u=-3(H_u/((\partial H_u)/(\partial u))) \quad \text{Eq.(5b)}.$$

It can be seen from Equations (5a,b) that distance can be calculated as a ratio of the absolute measurement to the gradient measurement times a factor of 3. This formula is valid only if the second well is in the approach zone of the beacon, i.e. the second well is substantially aligned with the beacon orientation. As described above, the beacon can be dynamically orientated in the direction of the second well to achieve such condition.

Figure 6:
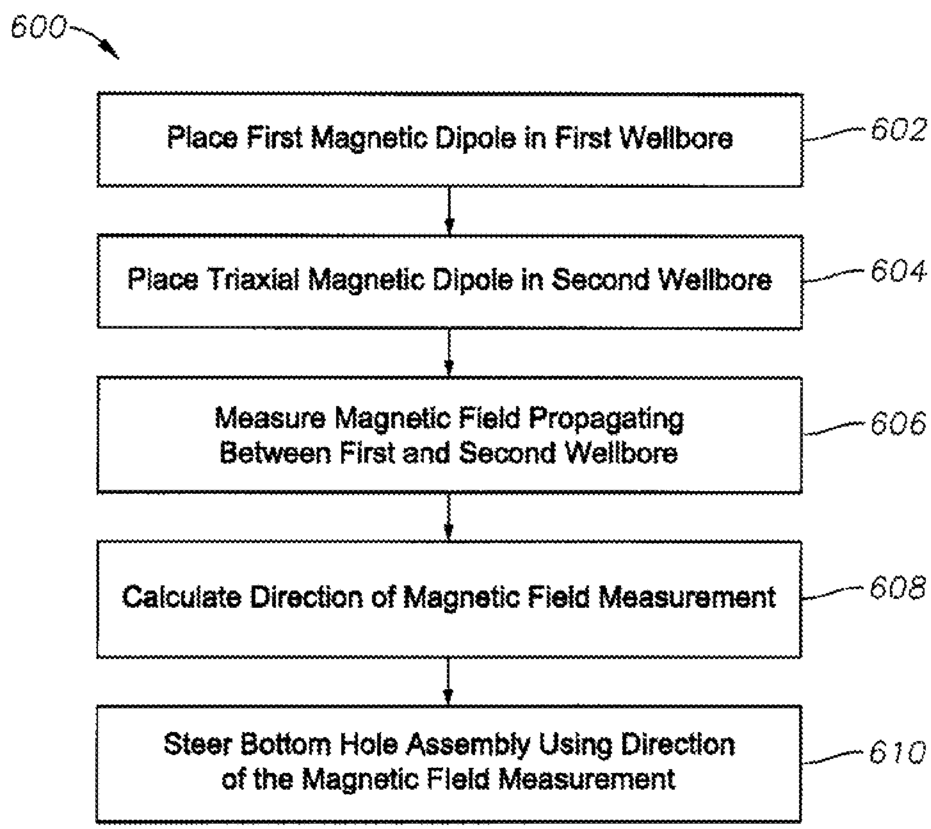
FIG. 6 is a flow chart of a generalized ranging method utilized to determine the relative position of a first and second wellbore, according to certain illustrative methods of the present disclosure.

FIG. 6 is a flow chart of a generalized ranging method 600 utilized to determine the relative position of a first and second wellbore, according to certain illustrative methods of the present disclosure. At block 602, a first magnetic dipole is positioned along a first wellbore. At block 604, a triaxial magnetic dipole is positioned along a second wellbore. The dipoles of the first and second wellbores may be beacons or receivers, as previously described. Thus, if the dipole of the first wellbore is a beacon, the dipole of the second wellbore is a receiver—and vice versa. Nevertheless, in either embodiment, at block 606 a magnetic field is propagated between the first and second wellbores (emitted from one of the dipoles), where it is measured by the opposing dipole in the other wellbore. At block 608, the system control center calculates the direction of the first magnetic field measurement, which can be calculated from the magnetic field measurements in three linearly independent directions using simple linear algebra. In the case where the three directions are all perpendicular to each other, the direction is simply the vector that is made from each of the measurements. In the case where three directions are not perpendicular to each other, a coordinate transformation can be applied. Thereafter, at block 610, the directional data is processed by the system control center to thereby steer the bottom hole assembly as desired based upon the direction data. In one embodiment, the bottom hole assembly is aligned to be in the direction of the first magnetic field measurement. In other embodiments, however, the bottom hole assembly may be steered to avoid the beacon emitting the dipole.

Method 600 may be implemented in a variety of ways. For example, as illustrated in FIGS. 1A-3, the bottom hole assembly 14 may be positioned along the second wellbore and comprise the triaxial magnetic dipole(s). In such an embodiment, the magnetic field is transmitted from one or more first magnetic dipoles (i.e., beacons) positioned in the first wellbore 10, and the first magnetic field measurement is then acquired in the second wellbore using the triaxial dipole(s). Alternatively, however, in this same embodiment, the magnetic field may be transmitted using the triaxial magnetic dipole(s) (i.e., beacon) in the second wellbore, and the first magnetic field measurement is obtained using the magnetic dipole in the first wellbore.

In yet another implementation of method 600, the bottom hole assembly 14 may be positioned along first wellbore 10 and comprise the first magnetic dipole(s). Here, the magnetic field may then be propagated from the second wellbore 12 using the triaxial magnetic dipole(s) (which may be positioned along wellbore 12 using any of the methods described herein). The first magnetic field measurements are then obtained using the first magnetic dipole(s) of assembly 14 in the first wellbore 10. Alternatively, however, in this same embodiment, the magnetic field may be transmitted using the first magnetic dipole as the beacon, and then the first magnetic field measurement is obtained using the triaxial magnetic dipole(s) in the second wellbore 12.

In yet other methods 600, at block 602, placement of the first magnetic dipole in the first wellbore is accomplished by placing at least one magnetic dipole in the first wellbore. It is also possible to synthetically generate a magnetic dipole by using combinations of multiple secondary dipoles as shown in systems 300C-E of FIG. 3. In certain embodiments, the secondary magnetic dipoles are collocated, meaning that their electrical centers are at the same position, where electrical center is the effective center of the equivalent magnetic dipole. As shown in systems 300C-E, three secondary magnetic dipoles may be utilized to synthesize the first magnetic dipole. This allows changing the angle of the beacon electrically, without any physical alteration.

Figure 7:
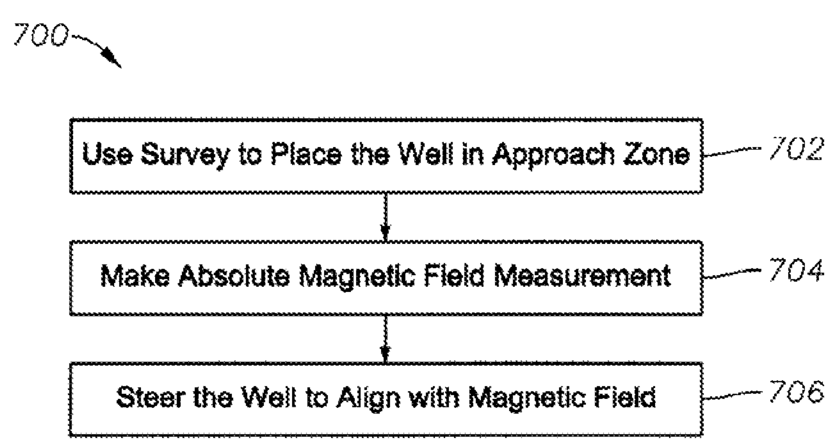
FIGS. 7, 8 and 9 are flow charts of alternative methods to determine the relative position of a first and second wellbore, according to certain illustrative methods of the present disclosure.
Figure 8:
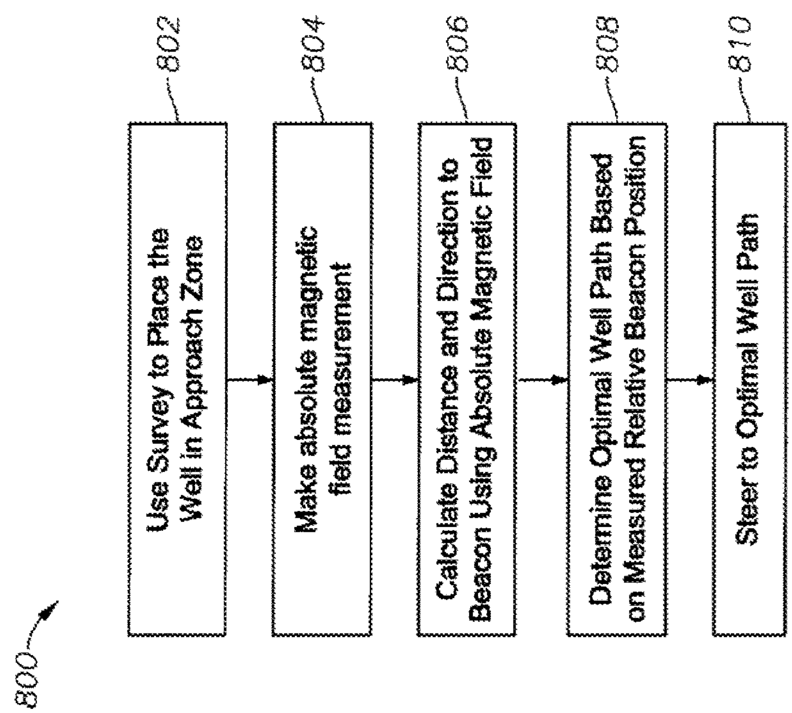
Figure 9:
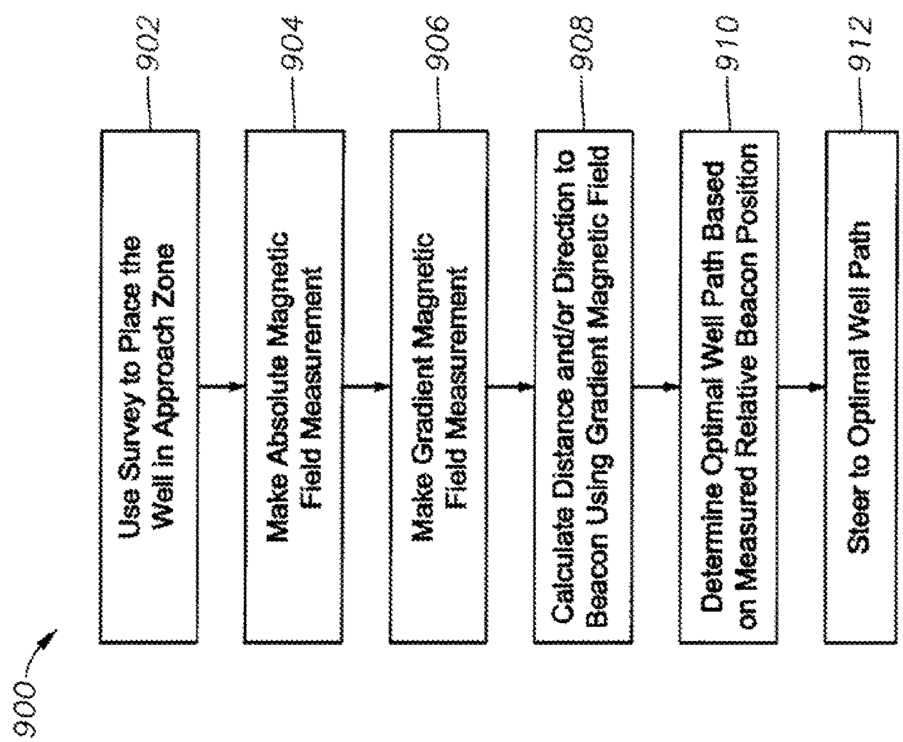

FIGS. 7, 8 and 9 are flow charts of more detailed methods to determine the relative position of a first and second wellbore, according to certain illustrative methods of the present disclosure. In method 700, the first magnetic dipole(s) and triaxial magnetic dipole(s) are positioned in the wellbores as previously described in method 600. At block 702, survey data is first used to place the second wellbore 12 within the approach zone. Based on the survey data, ideal drilling path and drilling direction of the well are determined and drilling is executed based on this information. At block 704, beacon 17 is activated to propagate the magnetic field, and the system control center (controlling the receiver dipole(s)), via receivers 16, obtains absolute magnetic field measurements as previously described. Thereafter, at block 706, the system control center determines the direction and distance to the beacon and steers the drilling assembly to align (or avoid) with the direction of the magnetic field. The method can be terminated if the wells are deemed to be very close to each other (if no intersection is desired) from the survey data.

In method 800, the first magnetic dipole(s) and triaxial magnetic dipole(s) are positioned in the wellbores as previously described. At block 802, survey data is first used to place the second wellbore within the approach zone. At block 804, beacon 17 is then activated to propagate the magnetic field, and the system control center, via the receiver(s) 16, obtains absolute magnetic field measurements. Using the measurements at block 806, the system control center then calculates the distance and direction to the beacon 17 using the absolute magnetic field measurement using Equation (3) described herein. At block 808, the system control center then determines the optimal well path based on the measured relative beacon position. At block 810, the drilling assembly is steered along the optimal well path.

In method 900, the first magnetic dipole(s) and triaxial magnetic dipole(s) are positioned in the wellbores as previously described. At block 902, survey data is first used to place the second wellbore within the approach zone. At block 904, beacon 17 is then activated to propagate the magnetic field, and the system control center, via the receiver(s) 16, obtains absolute magnetic field measurements. At block 906, the system control center, using two or more receivers 16 and their measurements, obtains a magnetic field gradient measurement. Using the absolute and gradient measurements at block 908, the system control center then calculates the distance and/or direction to the beacon 17 using the using the Equations (3) and (5), respectively, described herein. At block 910, the system control center then determines the optimal well path based on the measured relative beacon position. At block 912, the drilling assembly is steered along the optimal well path.

Alternatively, using any of methods 700, 800 or 900, the system control center may adjust the direction of the beacon before or after the first magnetic field measurement is obtained. To do so, the system control center first calculates the expected bit position and drilling orientation of the second wellbore 12 based upon survey data. Then the system control center determines an optimal well path based on drilling considerations such as mechanical properties of layers. Thereafter, the direction of the beacon may be adjusted based upon the optimal well path of the second wellbore. This can allow execution of drilling in an optimal well path rather than a random one and it can produce savings in drilling time, cost and enhance safety.

As previously described, in an alternative application, the relative positioning system and methods of this disclosure are also useful in well avoidance operations. In such an application, a target well is not necessarily present. Nevertheless, in one illustrative method, the relative positioning system is deployed along a drilling assembly. During drilling, processing circuitry on-board (or remote to) the system actively searches for other magnetic fields emitted from beacons utilizing the various components and magnetic field features described herein. Once the magnetic fields are measured and analyzed, the positioning system alters the drill path accordingly.

Therefore, embodiments of the present disclosure described herein utilize the natural shape of magnetic fields for guidance and landing of wellbores. Embodiments of the disclosure do not require any interpretation, distance or direction calculation in the approach phase. As a result, the system does not require any synchronization between the beacon and the receivers, and it can function even in the case of lower signal to noise ratios which translates to larger range of operation. The system also allows landing of the wells on top of each other from opposite directions, which could potentially decrease the total time of the drilling operation in a SAGD operation (if both wells are injectors, or both are producers). Furthermore, the disclosed systems can be used to intersect the wells head-on, which can, again, be used for various purposes, such as to reduce the time of drilling, or to be able to have two access points to a well for optimized production.

Embodiments described herein further relate to any one or more of the following paragraphs:

1. A method for downhole ranging, the method comprising placing a first magnetic dipole in a first wellbore; placing a triaxial magnetic dipole in a second wellbore; obtaining a first measurement of a magnetic field propagating between the first and second wellbores; calculating a direction of the first magnetic field measurement; and steering a bottom hole assembly based upon the direction of the first magnetic field measurement.

2. A method as defined in paragraph 1, wherein the bottom hole assembly is positioned along the second wellbore, the bottom hole assembly comprising the triaxial magnetic dipole; and obtaining the first measurement comprises: transmitting the magnetic field from the first wellbore using the first magnetic dipole; and obtaining the first magnetic field measurement using the triaxial magnetic dipole in the second wellbore.

3. A method as defined in any of paragraphs 1-2, wherein the bottom hole assembly is positioned along the second wellbore, the bottom hole assembly comprising the triaxial magnetic dipole; and obtaining the first measurement comprises: transmitting the magnetic field from the second wellbore using the triaxial magnetic dipole; and obtaining the first magnetic field measurement using the first magnetic dipole in the first wellbore.

4. A method as defined in any of paragraphs 1-3, wherein the bottom hole assembly is positioned along the first wellbore, the bottom hole assembly comprising the first magnetic dipole; and obtaining the first measurement comprises: transmitting the magnetic field from the second wellbore using the triaxial magnetic dipole; and obtaining the first magnetic field measurement using the first magnetic dipole in the first wellbore.

5. A method as defined in any of paragraphs 1-4, wherein the bottom hole assembly is positioned along the first wellbore, the bottom hole assembly comprising the first magnetic dipole; and obtaining the first measurement comprises: transmitting the magnetic field from the first wellbore using the first magnetic dipole; and obtaining the first magnetic field measurement using the triaxial magnetic dipole in the second wellbore.

6. A method as defined in any of paragraphs 1-5, wherein steering the bottom hole assembly based upon the direction of the first magnetic field measurement comprises aligning the bottom hole assembly to the direction of the first magnetic field measurement.

7. A method as defined in any of paragraphs 1-6, wherein placing the first magnetic dipole in the first wellbore comprises placing at least two secondary magnetic dipoles in the first wellbore; and synthesizing the first magnetic dipole using the at least two secondary dipoles.

8. A method as defined in any of paragraphs 1-7, wherein the at least two secondary magnetic dipoles are collocated.

9. A method as defined in any of paragraphs 1-8, wherein the at least two secondary magnetic dipoles comprise three secondary magnetic dipoles.

10. A method as defined in any of paragraphs 1-9, further comprising adjusting a direction of the first magnetic dipole after at least one first magnetic field measurement is obtained.

11. A method as defined in any of paragraphs 1-10, wherein adjusting the direction of the first magnetic dipole comprises analyzing survey data of the second wellbore; calculating an expected well path of the second wellbore based upon the survey data; and adjusting the direction of the first magnetic dipole based upon the expected well path of the second wellbore.

12. A method as defined in any of paragraphs 1-11, further comprising placing a third magnetic dipole along the first wellbore; utilizing the third magnetic dipole to obtain a second measurement of the magnetic field propagating between the first and second wellbores; and calculating a direction of the second magnetic field measurement, wherein the directions of the first and second magnetic field measurements are utilized to steer the bottom hole assembly.

13. A method as defined in any of paragraphs 1-12, further comprising calculating a distance between the first and second wellbores based upon an amplitude of the first magnetic field measurement.

14. A method as defined in any of paragraphs 1-13, wherein the distance is calculated using: $u=3\sqrt{(1/(2\pi Hu))}$.

15. A method as defined in any of paragraphs 1-14, further comprising obtaining a magnetic field gradient measurement using the first and second magnetic field measurements; and utilizing the magnetic field gradient measurement to calculate a distance between the first and second wellbores.

16. A method as defined in any of paragraphs 1-15, wherein obtaining the magnetic field gradient measurement further comprises calculating an amplitude of the first magnetic field measurement; and calculating the distance between the first and second wellbores further comprises calculating a ratio of the amplitude of the first magnetic field measurement to the magnetic field gradient measurement.

17. A method as defined in any of paragraphs 1-16, wherein the ratio is expressed as: $u=-3(Hu/((\partial Hu)/(\partial u)))$.

18. A method as defined in any of paragraphs 1-18, wherein the first wellbore is a producer well; and the second wellbore is an injector well, wherein the method is utilized in a Steam Assisted Gravity Drainage operation.

19. A method as defined in any of paragraphs 1-18, wherein the first wellbore is a blow out well; and the second wellbore is an intersecting well, wherein the method is utilized to stop a hydrocarbon spill emitting from the blow out well.

20. A method as defined in any of paragraphs 1-19, wherein the method is utilized to intersect the first and second wellbores to create a single well.

21. A method as defined in any of paragraphs 1-20, wherein the first wellbore is intersected with an end of the second wellbore.

22. A method as defined in any of paragraphs 1-21, wherein the first wellbore is intersected substantially perpendicularly with the second wellbore.

23. A method as defined in any of paragraphs 1-22, wherein the method is utilized in a well avoidance operation.

24. A method as defined in any of paragraphs 1-23, wherein the bottom hole assembly is a drilling assembly, logging assembly or wireline assembly.

25. A downhole ranging system comprising processing circuitry to implement any of the methods of claims 1-24.

Moreover, the methodologies described herein may be embodied within a computer-program product comprising instructions which, when executed by at least one processor, causes the processor to perform any of the methods described herein.

Although various embodiments and methodologies have been shown and described, the disclosure is not limited to such embodiments and methodologies and will be understood to include all modifications and variations. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for downhole ranging, the method comprising:

placing a first magnetic dipole in a first wellbore;

placing a triaxial magnetic beacon in a second wellbore;

obtaining a first measurement of a magnetic field propagating between the first and second wellbores, wherein the first magnetic field has a natural shape;

calculating a direction of the first magnetic field measurement based upon the natural shape of the magnetic field;

determining a path of approach based on the natural shape of the magnetic field; and steering a bottom hole assembly based upon the path of approach.

2. A method as defined in claim 1, wherein:

the bottom hole assembly is positioned along the second wellbore, the bottom hole assembly comprising the triaxial magnetic beacon; and obtaining the first measurement of the magnetic field comprises:

generating the magnetic field from the first wellbore with the first magnetic dipole; and receiving and measuring the magnetic field with the triaxial magnetic beacon in the second wellbore.

3. A method as defined in claim 1, wherein:

the bottom hole assembly is positioned along the second wellbore, the bottom hole assembly comprising the triaxial magnetic beacon; and obtaining the first measurement of the magnetic field comprises:

generating the magnetic field from the second wellbore with the triaxial magnetic beacon; and receiving and measuring the magnetic field with the first magnetic dipole in the first wellbore.

4. A method as defined in claim 1, wherein:

the bottom hole assembly is positioned along the first wellbore, the bottom hole assembly comprising the first magnetic dipole; and obtaining the first measurement of the magnetic field comprises:

generating the magnetic field from the second wellbore with the triaxial magnetic beacon; and receiving and measuring the magnetic field with the first magnetic dipole in the first wellbore.

5. A method as defined in claim 1, wherein:

the bottom hole assembly is positioned along the first wellbore, the bottom hole assembly comprising the first magnetic dipole; and obtaining the first measurement of the magnetic field comprises:

generating the magnetic field from the first wellbore with the first magnetic dipole; and receiving and measuring the magnetic field with the triaxial magnetic beacon in the second wellbore.

6. A method as defined in claim 1, wherein steering the bottom hole assembly based upon the direction of the first magnetic field measurement comprises aligning the bottom hole assembly to the direction of the first magnetic field measurement.

7. A method as defined in claim 1, wherein placing the first magnetic dipole in the first wellbore comprises:

placing at least two secondary magnetic dipoles in the first wellbore; and synthesizing the first magnetic dipole using the at least two secondary dipoles.

8. A method as defined in claim 7, wherein the at least two secondary magnetic dipoles are collocated.

9. A method as defined in claim 7, wherein the at least two secondary magnetic dipoles comprise three secondary magnetic dipoles.

10. A method as defined in claim 1, further comprising adjusting a direction of the first magnetic dipole after at least one first magnetic field measurement is obtained.

11. A method as defined in claim 10, wherein adjusting the direction of the first magnetic dipole comprises:

analyzing survey data of the second wellbore;

calculating an expected well path of the second wellbore based upon the survey data; and adjusting the direction of the first magnetic dipole based upon the expected well path of the second wellbore.

12. A method as defined in claim 1, further comprising:

placing a third magnetic dipole along the first wellbore;

utilizing the third magnetic dipole to obtain a second measurement of the magnetic field propagating between the first and second wellbores; and calculating a direction of the second magnetic field measurement, wherein the directions of the first and second magnetic field measurements are utilized to steer the bottom hole assembly.

13. A method as defined in claim 1, further comprising calculating a distance between the first and second wellbores based upon an amplitude of the first magnetic field measurement.

14. A method as defined in claim 13, wherein the distance is calculated using:

$$u=\sqrt[3]{(1/(2\pi H_u))}.$$

15. A method as defined in claim 12, further comprising:

obtaining a magnetic field gradient measurement using the first and second magnetic field measurements; and utilizing the magnetic field gradient measurement to calculate a distance between the first and second wellbores.

16. A method as defined in claim 15, wherein:

obtaining the magnetic field gradient measurement further comprises calculating an amplitude of the first magnetic field measurement; and calculating the distance between the first and second wellbores further comprises calculating a ratio of the amplitude of the first magnetic field measurement to the magnetic field gradient measurement.

17. A method as defined in claim 16, wherein the ratio is expressed as:

$$u=-3(H_u/((\partial H_u)/(\partial u))).$$

18. A method as defined in claim 1, wherein:

the first wellbore is a producer well; and the second wellbore is an injector well, wherein the method is utilized in a Steam Assisted Gravity Drainage operation.

19. A method as defined in claim 1, wherein:

the first wellbore is a blow out well; and the second wellbore is an intersecting well, wherein the method is utilized to stop a hydrocarbon spill emitting from the blow out well.

20. A method as defined in claim 1, wherein the method is utilized to intersect the first and second wellbores to create a single well.

21. A method as defined in claim 20, wherein the first wellbore is intersected with an end of the second wellbore.

22. A method as defined in claim 20, wherein the first wellbore is intersected substantially perpendicularly with the second wellbore.

23. A method as defined in claim 1, wherein the method is utilized in a well avoidance operation.

24. A method as defined in claim 1, wherein the bottom hole assembly is a drilling assembly, logging assembly or wireline assembly.

25. A non-transitory computer readable medium comprising instructions configured to cause a downhole ranging system to perform operations comprising:

obtaining, from a triaxial magnetic beacon disposed within a second wellbore, a first measurement of a magnetic field generated by a first magnetic dipole disposed within a first wellbore and propagating between the first wellbore and the second wellbore;

calculating a direction of the first magnetic field measurement based upon the natural shape of the magnetic field;

determining a path of approach based on the natural shape of the magnetic field; and generating signals to steer a bottom hole assembly based upon the path of approach.

* * * * *